United States Patent
Liu et al.

(10) Patent No.: US 11,740,954 B2
(45) Date of Patent: Aug. 29, 2023

(54) METHOD, APPARATUS AND SYSTEM FOR STORING FAULT DATA, AND COMPUTER-READABLE MEDIUM

(71) Applicant: Siemens Ltd., China, Beijing (CN)

(72) Inventors: Hao Liu, Beijing (CN); Jing Li, Beijing (CN); Dan Wang, Chengdu (CN); Wen Tao Hua, Beijing (CN); Ang Li, Beijing (CN)

(73) Assignee: Siemens Ltd., China, Beijing (CN)

( * ) Notice: Subject to any disclaimer, the term of this patent is extended or adjusted under 35 U.S.C. 154(b) by 0 days.

(21) Appl. No.: 17/614,105

(22) PCT Filed: May 31, 2019

(86) PCT No.: PCT/CN2019/089456
§ 371 (c)(1),
(2) Date: Nov. 24, 2021

(87) PCT Pub. No.: WO2020/237613
PCT Pub. Date: Dec. 3, 2020

(65) Prior Publication Data
US 2022/0327017 A1    Oct. 13, 2022

(51) Int. Cl.
G06F 11/00    (2006.01)
G06F 11/07    (2006.01)

(52) U.S. Cl.
CPC ...... *G06F 11/0787* (2013.01); *G06F 11/0727* (2013.01)

(58) Field of Classification Search
None
See application file for complete search history.

(56) References Cited

U.S. PATENT DOCUMENTS

2010/0312522 A1* 12/2010 Laberge ............ G05B 23/0278
                                                            702/184
2020/0387417 A1* 12/2020 Wang ................. H04L 9/50
(Continued)

FOREIGN PATENT DOCUMENTS

CN    102629364 A    8/2012
CN    106650186 A    5/2017
(Continued)

OTHER PUBLICATIONS

Google Scholar/Patents search—text refined (Year: 2022).*
(Continued)

*Primary Examiner* — Christopher S McCarthy
(74) *Attorney, Agent, or Firm* — Harness, Dickey & Pierce, P.L.C.

(57) ABSTRACT

Provided are a method, apparatus and system for storing fault data, an embodiment of the fault data storage method including: acquiring fault data of a target electrical device; sending a consensus request for the fault data, usable to request that consensus personnel who use the consensus client reach a consensus for the reason why the target electrical device is faulty, to at least one consensus client; respectively receiving a consensus result from each consensus client, the consensus result being formed by the consensus client according to the triggering of the consensus personnel; determining, according to each received consensus result, whether the reason for why the target electrical device is faulty is due to device quality; generating, upon the reason for why the target electrical device is faulty being due to device quality, a first data block which contains the fault data; and storing the first data block into a blockchain.

16 Claims, 13 Drawing Sheets

(56) References Cited

U.S. PATENT DOCUMENTS

2021/0375409 A1* 12/2021 Romantsov ......... H04L 67/1097
2022/0187813 A1*  6/2022 Khurshudov ........ G05B 23/024

FOREIGN PATENT DOCUMENTS

| CN | 107748850 A | 3/2018 |
| CN | 108495329 A | 9/2018 |
| GB |   2208950 A | 4/1989 |

OTHER PUBLICATIONS

CN 108495329, China United Network Communications Group Co., LTD, "Method and Apparatus for Evaluating Reliability of Base Station", WIPO translation of Description. Sep. 4, 2018 (Year: 2022).*
Google Scholar/Patents search—text refined (Year: 2023).*
Satoshi Nakamoto: "Bitcoin: A Peer-to-Peer Electronic Cash System"; retrieved from the Internet: URL:https://bitcoin.org/bitcoin.pdf (retrieved on Nov. 12, 2018); 2008; XP055532810.

* cited by examiner

METHOD, APPARATUS AND SYSTEM FOR STORING FAULT DATA, AND COMPUTER-READABLE MEDIUM

PRIORITY STATEMENT

This application is the national phase under 35 U.S.C. 371 of PCT International Application No. PCT/CN2019/089546 which has an International filing date of May 31, 2019, which designated the United States of America 2020, the entire contents of which are hereby incorporated herein by reference.

FIELD

Embodiments of the present invention generally relate to the technical field of data storage, and in particular to a method, apparatus and system for storing fault data and a computer-readable medium.

BACKGROUND

A huge amount of power equipment is widely used in the power and energy fields, and the use of power equipment is still increasing along with the construction of new projects and the upgrading and transformation of existing ones in the power and energy fields. Various faults may occur during the operation of power equipment. Fault data can be obtained during operation or maintenance of faulty power equipment, and the quality of the power equipment can be evaluated by analyzing the fault data.

At present, the obtained fault data is used directly to evaluate the quality of power equipment. As faults of power equipment may be caused by factors other than quality of the equipment, for example, human operation errors, and the fault data may be maliciously tampered with in order to have a better result of quality evaluation, the objectivity of the result of evaluation of power equipment will be poor when fault data is used to evaluate the quality of the equipment.

SUMMARY

The method, apparatus, system and computer-readable medium for storing fault data provided by at least one embodiment of the present invention can ensure objectivity of the result of evaluation of the quality of power equipment by use of stored fault data.

In the first aspect, an embodiment of the present invention provides a method for storing fault data, comprising:

obtaining fault data of target power equipment, wherein the target power equipment is faulty power equipment;

sending a consensus request targeting the fault data to at least one consensus client, wherein the consensus request is used to request the consensus person using the consensus client to give a consensus on the cause of the fault of the target power equipment;

respectively receiving a consensus result from each of the consensus clients, wherein the consensus result is formed by the consensus client based on triggering by the consensus person;

deciding whether the fault of the target power equipment results from the equipment quality based on each of the received consensus results; and generating a first data block comprising the fault data, and storing the first data block in a blockchain, when the fault of the target power equipment results from the equipment quality.

In a second aspect, an embodiment of the present invention provides an apparatus for storing fault data, comprising:

a data obtaining module, used to obtain fault data of target power equipment, wherein the target power equipment is faulty power equipment;

a request sending module, used to send a consensus request targeting the fault data obtained by the data obtaining module to at least one consensus client, wherein the consensus request is used to request the consensus person using the consensus client to give a consensus on the cause of the fault of the target power equipment;

a result receiving module, used to respectively receive a consensus result from each of the consensus clients, wherein the consensus result is formed by the consensus client that receives the consensus request sent by the request sending module based on triggering by the consensus person;

a consensus deciding module, used to decide whether the fault of the target power equipment results from the equipment quality based on each of the consensus results received by the result receiving module; and a first storage module, used to generate a first data block comprising the fault data obtained by the data obtaining module, and store the first data block in a blockchain, when the consensus deciding module decides that the fault of the target power equipment results from the equipment quality.

In a third aspect, an embodiment of the present invention provides an apparatus for storing fault data, comprising:

at least one memory; and at least one processor;

the at least one memory is used to store a machine-readable program; and the at least one processor is used to call the machine-readable program to execute the method provided by the first aspect of an embodiment and any of the possible implementations of the first aspect of an embodiment.

In a fourth aspect, an embodiment of the present invention provides a system for storing fault data, comprising:

at least one consensus client and any of the apparatuses for storing fault data provided by the second aspect of an embodiment, any of the possible implementations of the second aspect and the third aspect of an embodiment;

the consensus client is used to receive the consensus request from the apparatus for storing fault data, display, based on the consensus request, the fault data targeted by the consensus request to a relevant consensus person, form a consensus result based on triggering by the consensus person, and send the consensus result to the apparatus for storing fault data.

In a fifth aspect, an embodiment of the present invention provides a computer-readable medium, which stores a computer instruction that, when executed by a processor, causes the processor to perform the method provided by the first aspect of an embodiment and any of the possible implementations of the first aspect of an embodiment.

REFERENCE NUMERALS IN THE DRAWINGS

Figure 1:
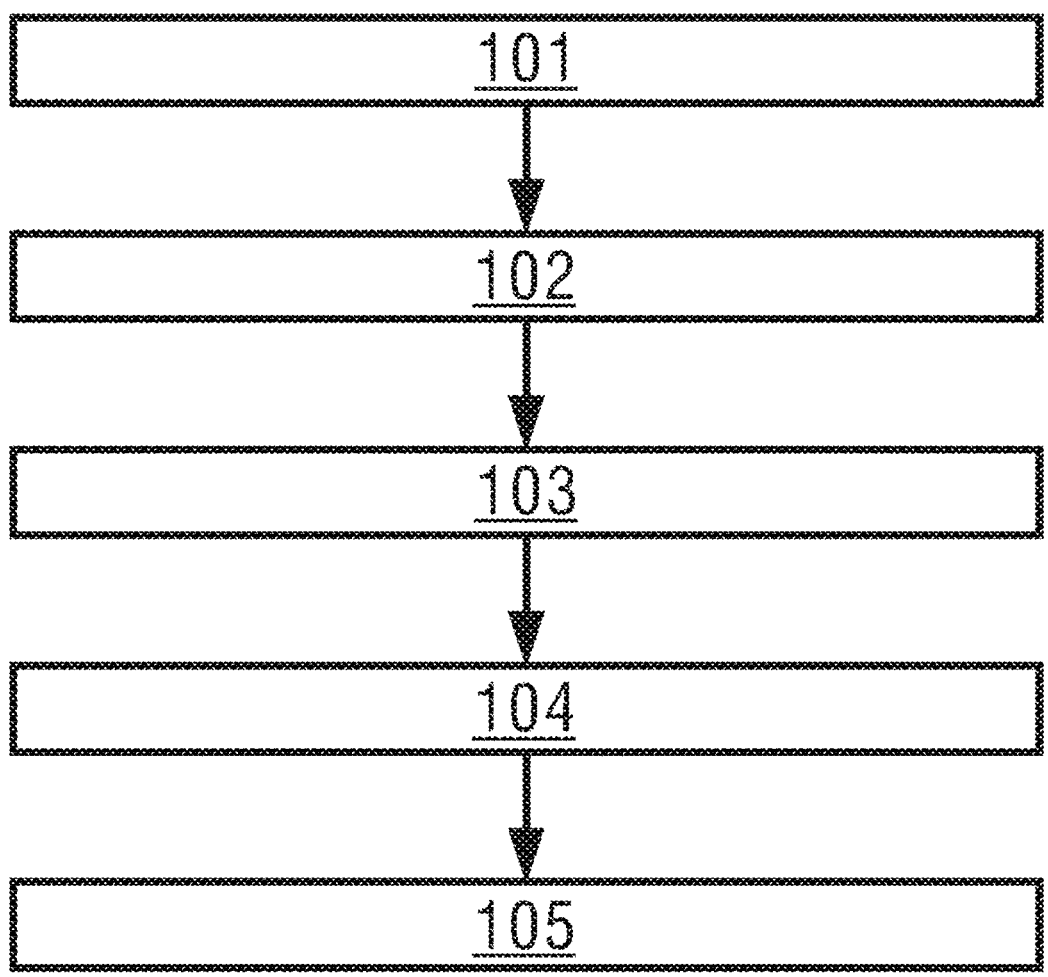
FIG. 1 is a flowchart of a method for storing fault data provided by one embodiment of the present invention.

101: obtaining fault data of the target power equipment
102: sending a consensus request targeting the fault data to at least one consensus client
103: respectively receiving a consensus result from each consensus client
104: deciding whether the fault of the target power equipment results from the equipment quality based on each of the consensus results
105: generating a first data block and storing the first data block in a blockchain when the deciding result is affirmative
201: obtaining the identity information of each of the consensus personnel
202: packing the fault data, each of the consensus results and the identity information, to obtain a first data block
301: obtaining the identity information of each of the consensus personnel
302: packing the fault data, the data type identifier, each of the consensus results and the identity information, to obtain a second data block
401: respectively determining the consensus score of each consensus result
402: summing up the consensus scores of all the consensus results, to obtain a total consensus score
403: deciding whether the total consensus score is greater than a predetermined consensus score threshold
404: deciding whether the fault of the target power equipment results from the equipment quality
405: deciding whether the fault of the target power equipment does not result from the equipment quality
1301: the apparatus for storing fault data obtains fault data of the target power equipment
1302: the apparatus for storing fault data sends a consensus request to a consensus client
1303: the consensus client obtains a consensus result given by a consensus person
1304: the consensus client sends the obtained consensus result to the apparatus for storing fault data
1305: the apparatus for storing fault data respectively determines the consensus score of each consensus result
1306: the apparatus for storing fault data sums up the consensus scores of all the consensus results, to obtain a total consensus score
1307: the apparatus for storing fault data decides whether the total consensus score is greater than a consensus score threshold
1308: the apparatus for storing fault data generates a first data block
1309: the apparatus for storing fault data stores the first data block in a blockchain
1310: the apparatus for storing fault data generates a second data block
1311: the apparatus for storing fault data stores the second data block in a blockchain
50: apparatus for storing fault data
60: consensus client
70: portable data acquisition terminal
501: data obtaining module
502: request sending module
503: result receiving module
504: consensus deciding module
505: first storage module
506: second storage module
801: memory
802: processor
5051: first information obtaining unit
5052: first data block forming unit
5061: second information obtaining unit
5062: second data block forming unit
5041: score obtaining unit
5042: score operation unit
5043: score evaluation unit
5044: result determining unit
80: apparatus for storing fault data
90: system for storing fault data

DETAILED DESCRIPTION OF THE EXAMPLE EMBODIMENTS

In the first aspect, an embodiment of the present invention provides a method for storing fault data, comprising:

obtaining fault data of target power equipment, wherein the target power equipment is faulty power equipment;

sending a consensus request targeting the fault data to at least one consensus client, wherein the consensus request is used to request the consensus person using the consensus client to give a consensus on the cause of the fault of the target power equipment;

respectively receiving a consensus result from each of the consensus clients, wherein the consensus result is formed by the consensus client based on triggering by the consensus person;

deciding whether the fault of the target power equipment results from the equipment quality based on each of the received consensus results; and generating a first data block comprising the fault data, and storing the first data block in a blockchain, when the fault of the target power equipment results from the equipment quality.

In a first possible implementation, according to the first aspect, generating a first data block comprising the fault data comprises:

for each of the received consensus results, obtaining the identity information of the consensus person who triggers the consensus client to form the consensus result; and packing the fault data, each of the consensus results and the identity information corresponding to each of the consensus results, to obtain a first data block.

In a second possible implementation, according to the first aspect, the method further comprises:

generating a second data block comprising the fault data and a data type identifier, and storing the second data block in a blockchain, when the fault of the target power equipment does not result from the equipment quality, wherein the data type identifier is used to mark that the fault of the target power equipment does not result from the equipment quality.

In a third possible implementation, according to the second possible implementation, generating a second data block comprising the fault data and a data type identifier comprises:

for each of the received consensus results, obtaining the identity information of the consensus person who triggers the consensus client to form the consensus result; and packing the fault data, the data type identifier, each of the consensus results and the identity information corresponding to each of the consensus results, to obtain a second data block.

In a fourth possible implementation, according to the first aspect, deciding whether the fault of the target power equipment results from the equipment quality based on each of the received consensus results comprises:

for each of the consensus results, determining that the consensus score corresponding to the consensus result is consensus permission points when the consensus result indicates that the fault of the target power equipment results from the equipment quality, wherein the consensus permission points correspond to the role ranking of the consensus person who triggers the consensus client to form the consensus result, different role rankings correspond to consensus permission points that are not completely the same, and the consensus permission points are greater than zero; and determining that the consensus score corresponding to the consensus result is equal to zero when the consensus result indicates that the fault of the target power equipment does not result from the equipment quality;

summing up the consensus scores of all the consensus results, to obtain a total consensus score;

deciding whether the total consensus score is greater than a predetermined consensus score threshold;

determining that the fault of the target power equipment results from the equipment quality when the total consensus score is greater than the consensus score threshold; and determining that the fault of the target power equipment does not result from the equipment quality when the total consensus score is smaller than or equal to the consensus score threshold.

In a fifth possible implementation, in combination with the first aspect and any of the first possible implementation, second possible implementation, third possible implementation and fourth possible implementation of the first aspect, obtaining fault data of the target power equipment comprises:

obtaining the fault data from a portable data acquisition terminal, wherein the fault data is generated by the portable data acquisition terminal according to inputs by the maintenance personnel, and the fault data comprises part or all of the appearance information and the root cause information of the fault of the target power equipment and image information and video information of the target power equipment.

In a second aspect, an embodiment of the present invention provides an apparatus for storing fault data, comprising:

a data obtaining module, used to obtain fault data of target power equipment, wherein the target power equipment is faulty power equipment;

a request sending module, used to send a consensus request targeting the fault data obtained by the data obtaining module to at least one consensus client, wherein the consensus request is used to request the consensus person using the consensus client to give a consensus on the cause of the fault of the target power equipment;

a result receiving module, used to respectively receive a consensus result from each of the consensus clients, wherein the consensus result is formed by the consensus client that receives the consensus request sent by the request sending module based on triggering by the consensus person;

a consensus deciding module, used to decide whether the fault of the target power equipment results from the equipment quality based on each of the consensus results received by the result receiving module; and a first storage module, used to generate a first data block comprising the fault data obtained by the data obtaining module, and store the first data block in a blockchain, when the consensus deciding module decides that the fault of the target power equipment results from the equipment quality.

In a first possible implementation, according to the second aspect, the first storage module comprises:

a first information obtaining unit, used to, for each of the consensus results received by the result receiving module, obtain the identity information of the consensus person who triggers the consensus client to form the consensus result; and a first data block forming unit, used to pack the fault data, each of the consensus results and the identity information obtained by the first information obtaining unit, to obtain a first data block.

In a second possible implementation, according to the second aspect, the apparatus for storing fault data further comprises:

a second storage module, used to generate a second data block comprising a data type identifier and the fault data obtained by the data obtaining module, and store the second data block in a blockchain, when the consensus deciding module decides that the fault of the target power equipment does not result from the equipment quality, wherein the data type identifier is used to mark that the fault of the target power equipment does not result from the equipment quality.

In a third possible implementation, according to the second possible implementation, the second storage module comprises:

a second information obtaining unit, used to, for each of the consensus results received by the result receiving module, obtain the identity information of the consensus person who triggers the consensus client to form the consensus result; and a second data block forming unit, used to pack the fault data, the data type identifier, each of the consensus results and the identity information obtained by the second information obtaining unit, to obtain a second data block.

In a fourth possible implementation, according to the second aspect, the consensus deciding module comprises:

a score obtaining unit, used to, for each of the consensus results, determine that the consensus score corresponding to the consensus result is consensus permission points when the consensus result indicates that the fault of the target power equipment results from the equipment quality, wherein the consensus permission points correspond to the role ranking of the consensus person who triggers the consensus client to form the consensus result, different role rankings correspond to consensus permission points that are not completely the same, and the consensus permission points are greater than zero; and determine that the consensus score corresponding to the consensus result is equal to zero when the consensus result indicates that the fault of the target power equipment does not result from the equipment quality;

a score operation unit, used to sum up all the consensus scores obtained by the score obtaining unit, to obtain a total consensus score;

a score evaluation unit, used to decide whether the total consensus score obtained by the score operation unit is greater than a predetermined consensus score threshold; and a result determining unit, used to, based on the evaluation result of the score evaluation unit, determine that the fault of the target power equipment results from the equipment quality when the total consensus score is greater than the consensus score threshold, and determine that the fault of the target power equipment does not result from the equipment quality when the total consensus score is smaller than or equal to the consensus score threshold.

In a fifth possible implementation, in combination with the second aspect and any of the first possible implementation, second possible implementation, third possible implementation and fourth possible implementation of the first aspect, the data obtaining module is used to obtain the fault data from a portable terminal, wherein the fault data is generated by the portable terminal according to inputs by the maintenance personnel, and the fault data comprises part or all of the appearance information and the root cause information of the fault of the target power equipment and image information and video information of the target power equipment.

In a third aspect, an embodiment of the present invention provides an apparatus for storing fault data, comprising:

at least one memory; and at least one processor;

the at least one memory is used to store a machine-readable program; and the at least one processor is used to call the machine-readable program to execute the method provided by the first aspect of an embodiment and any of the possible implementations of the first aspect of an embodiment.

In a fourth aspect, an embodiment of the present invention provides a system for storing fault data, comprising:

at least one consensus client and any of the apparatuses for storing fault data provided by the second aspect of an embodiment, any of the possible implementations of the second aspect and the third aspect of an embodiment;

the consensus client is used to receive the consensus request from the apparatus for storing fault data, display, based on the consensus request, the fault data targeted by the consensus request to a relevant consensus person, form a consensus result based on triggering by the consensus person, and send the consensus result to the apparatus for storing fault data.

In a possible implementation, according to the fourth aspect, the apparatus for storing fault data further comprises:

a portable data acquisition terminal;

the portable data acquisition terminal is used to generate the fault data according to inputs by the maintenance personnel, and send the fault data to the apparatus for storing fault data, wherein the fault data comprises part or all of the appearance information and the root cause information of the fault of the target power equipment and image information and video information of the target power equipment.

In a fifth aspect, an embodiment of the present invention provides a computer-readable medium, which stores a computer instruction that, when executed by a processor, causes the processor to perform the method provided by the first aspect of an embodiment and any of the possible implementations of the first aspect of an embodiment.

It can be seen from the technical solutions of at least one embodiment that, after the fault data of targeted faulty power equipment is obtained, a consensus request targeting the fault data is sent to consensus clients used by consensus personnel, who reach consensus on the cause of the fault of the target power equipment based on the fault data; after the consensus results given by the consensus personnel are obtained from the consensus clients, it is decided whether the fault of the target power equipment results from the equipment quality based on each consensus result; after it is determined that the fault of the target power equipment results from the equipment quality, a first data block comprising the fault data is generated and stored in a blockchain. It can be seen that, firstly, the fault data comprised in the first data block corresponds to fault of the target power equipment due to the equipment quality, and secondly, since the first data block is stored in a blockchain, it can be ensured that the fault data cannot be tampered with, thereby ensuring high objectivity of the evaluation result when the fault data comprised in different first data blocks stored in the blockchain is used to evaluate the quality of power equipment.

As mentioned previously, although the quality of power equipment can be evaluated by analyzing fault data of the power equipment, as faults of power equipment may be caused by factors other than quality of the equipment, for example, human operation errors, and the fault data may be maliciously tampered with, the objectivity of the result of evaluation of power equipment will be poor when fault data is directly used to evaluate the quality of power equipment.

In the embodiments of the present invention, after the fault data of targeted power equipment is obtained, a consensus request targeting the fault data is sent to at least one consensus client, and each of the consensus personnel using the consensus clients gives consensus on the cause of the fault of the target power equipment; after the consensus results formed by the consensus clients based on triggering by the consensus personnel, it is decided whether the fault of the target power equipment results from the equipment quality based on the consensus result given by each of the consensus personnel; after it is determined that the fault of the target power equipment results from the equipment quality, a first data block comprising the fault data is generated and stored in a blockchain. For one thing, the consensus personnel reach consensus on the cause of the fault of the target power equipment, and it is decided that the fault of the target power equipment results from the equipment quality before the first data block comprising the fault data is stored in a blockchain, thereby ensuring that the fault data stored in the first data block corresponds to a fault arising from the factor of equipment quality; for another, the first data block is stored in a blockchain, thereby ensuring that the fault data cannot be tampered with. In consideration of the two aspects above, objectivity of the quality evaluation result can be ensured when the fault data comprised in the first data block stored in the blockchain is used to evaluate the quality of the power equipment.

The method, apparatus and system for storing fault data provided by the embodiments of the present invention are described in detail below with reference to the drawings.

As shown in FIG. 1, the embodiments of the present invention provide a method for storing fault data, which may comprise the following steps:

Step 101: obtaining fault data of target power equipment, wherein the target power equipment is faulty power equipment;

Step 102: sending a consensus request targeting the fault data to at least one consensus client, wherein the consensus request is used to request the consensus person using the consensus client to give a consensus on the cause of the fault of the target power equipment;

Step 103: respectively receiving a consensus result from each of the consensus clients, wherein the consensus result is formed by the consensus client based on triggering by the consensus person;

Step 104: deciding whether the fault of the target power equipment results from the equipment quality based on each of the received consensus results; and Step 105: generating a first data block comprising the fault data, and storing the first data block in a blockchain, when the fault of the target power equipment results from the equipment quality.

With the method for storing fault data provided by the embodiments of the present invention, after the fault data of targeted faulty power equipment is obtained, a consensus request targeting the fault data is sent to consensus clients used by consensus personnel, who reach consensus on the cause of the fault of the target power equipment based on the fault data; after the consensus results given by the consensus personnel are obtained from the consensus clients, it is decided whether the fault of the target power equipment results from the equipment quality based on each consensus result; after it is determined that the fault of the target power equipment results from the equipment quality, a first data block comprising the fault data is generated and stored in a blockchain. It can be seen that, firstly, the fault data comprised in the first data block corresponds to fault of the target power equipment due to the equipment quality, and secondly, since the first data block is stored in a blockchain, it can be ensured that the fault data cannot be tampered with, thereby ensuring high objectivity of the evaluation result when the fault data comprised in different first data blocks stored in the blockchain is used to evaluate the quality of power equipment.

Figure 2:
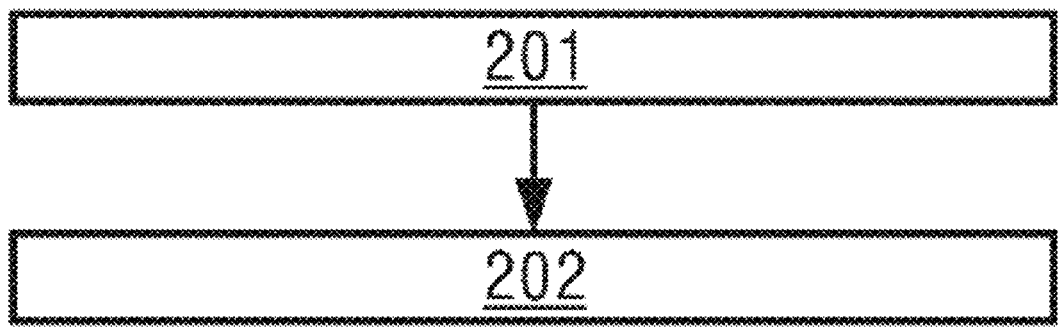
FIG. 2 is a flowchart of a method for generating the first data block provided by one embodiment of the present invention.

Optionally, based upon the method for storing fault data as shown in FIG. 1, to generate the first data block comprising the fault data in step 105, the fault data, the consensus result given by each of the consensus personnel and the identity information of each of the consensus personnel may be packed into the first data block. Specifically, as shown in FIG. 2, the generation of the first data block may be implemented in the following way:

Step 201: for each of the received consensus results, obtaining the identity information of the consensus person who triggers the consensus client to form the consensus result; and Step 202: packing the fault data, each of the consensus results and the identity information of each of the consensus personnel giving the consensus results, to obtain a first data block.

After it is decided that the fault of the target power equipment results from the equipment quality based on the consensus result given by each of the consensus personnel, the fault data, the consensus result given by each of the consensus personnel and the identity information of each of the consensus personnel are packed into the first data block, and then the first data block is stored in the blockchain. Since the first data block stored in the blockchain cannot be tampered with, the consensus result given by each of the consensus personnel based on the fault data cannot be tampered with; since the consensus results and the identity information of the consensus personnel are stored on the blockchain as a consensus record, the consensus action of the consensus personnel can be identified through inquiries of the consensus results and the identity information stored in the blockchain, thereby easily determining whether the consensus personnel maliciously gives a consensus result inconsistent with facts, which will deter the consensus personnel in their consensus action, prevent them from giving wrong consensus results for illegal profits, and ensure accuracy of the decision on the cause of a fault of power equipment.

In the embodiments of the present invention, when the fault data, the consensus result given by each of the consensus personnel and the identity information of each of the consensus personnel are packed into the first data block, for each of the consensus personnel, the consensus result given by the consensus person and the identity information of the consensus person are stored in the first data block in a paired manner. In this way, when the first data block is read from the blockchain, the consensus result given by each of the consensus personnel for the fault data in the first data block can be clearly identified.

Optionally, based upon the method for storing fault data as shown in FIG. 1, whether the fault of the target power equipment results from the equipment quality is decided based on each of the consensus results in Step 104, the fault data may also be stored in the blockchain for reference if it is decided that the fault of the target power equipment does not result from the equipment quality. Specifically, when it is decided that the fault of the target power equipment does not result from the equipment quality, a second data block comprising the fault data and a data type identifier may be generated and then stored in the blockchain, wherein the data type identifier is used to mark that the fault of the target power equipment does not result from the equipment quality.

After it is decided that the fault of the target power equipment does not result from the equipment quality based on each of the consensus results, although it is impossible to evaluate the quality of the power equipment by use of the fault data, the fault data can be stored in the blockchain for reference so as to facilitate verification of the authenticity, reliability and objectivity of the quality evaluation result later.

In addition, since fault data corresponding to a cause of fault that is not equipment quality cannot be used in the evaluation of equipment quality, it is necessary to distinguish between fault data corresponding to causes of faults that are not equipment quality and fault data corresponding to causes of faults that are equipment quality. For this, a data type identifier may be added to the second data block, and the data type identifier is used to mark that the fault data in the second data block corresponds to a cause of fault that is not equipment quality. In this way, when fault data is needed to evaluate the quality of power equipment, the first data blocks and the second data blocks in the blockchain can be distinguished based on whether they comprise the data type identifier, and thus only the fault data in each of the first data blocks is read to evaluate the quality of power equipment, thereby ensuring the accuracy and reliability of the evaluation of power equipment quality.

Figure 3:
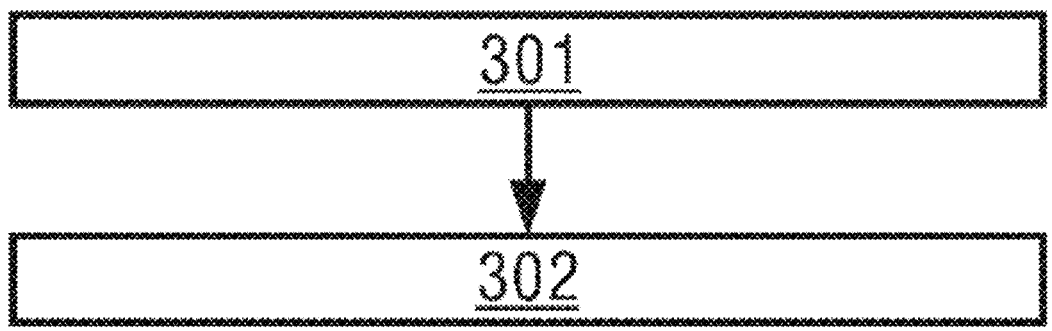
FIG. 3 is a flowchart of a method for generating the second data block provided by one embodiment of the present invention.

Optionally, to generate the second data block comprising the fault data and the data type identifier, the fault data, the data type identifier, each of the consensus results and the identity information of each of the consensus personnel can be packed into the second data block. Specifically, as shown in FIG. 3, the generation of the second data block may be implemented in the following way:

Step 301: for each of the received consensus results, obtaining the identity information of the consensus person who triggers the consensus client to form the consensus result; and Step 302: packing the fault data, the data type identifier, each of the consensus results and the identity information of each of the consensus personnel giving the consensus results, to obtain a second data block.

After it is decided that the fault of the target power equipment does not result from the equipment quality based on the consensus result given by each of the consensus personnel, the fault data, the data type identifier, the consensus result given by each of the consensus personnel and the identity information of each of the consensus personnel are packed into the second data block, and then the second data block is stored in the blockchain. Since the second data block stored in the blockchain cannot be tampered with, the consensus result given by each of the consensus personnel based on the fault data and the identity information of the consensus personnel cannot be tampered with, and the consensus result given by each of the consensus personnel based on the fault data can be identified through inquiries of the consensus results and the identity information in the second data block, which will deter the consensus personnel in their consensus action, prevent them from intentionally giving a consensus result indicating the equipment quality is the cause of a fault that does not result from the equipment quality, and further ensure accuracy of the decision on the cause of a fault of power equipment.

In the embodiments of the present invention, similar to the process of forming the first data block, when the second data block is formed, for each of the consensus personnel, the consensus result given by a consensus person and the identity information of the consensus person are stored in the second data block in a paired manner, so that the consensus result given by each of the consensus personnel for the fault data in the second data block can be clearly identified when the second data block is read from the blockchain.

Figure 4:
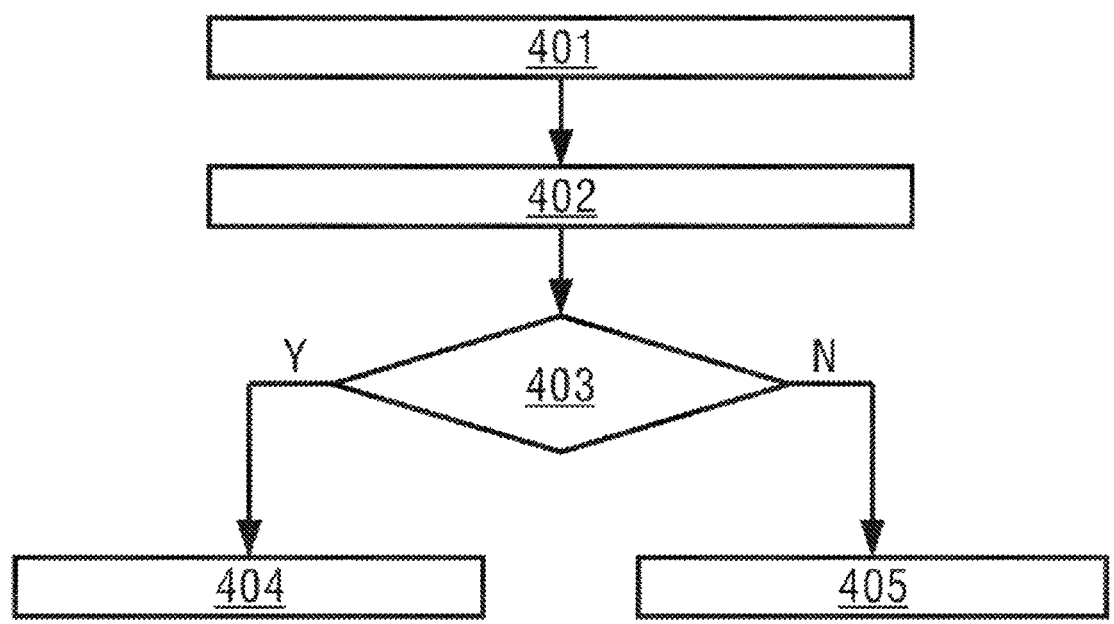
FIG. 4 is a flowchart of a method for determining the cause of a fault provided by one embodiment of the present invention.

Optionally, based upon the method for storing fault data as shown in FIG. 1, to decide whether the fault of the target power equipment results from the equipment quality based on each of the consensus results in Step 104, each consensus result may be converted into a corresponding consensus score, and thus whether the fault of the target power equipment results from the equipment quality can be decided based on each of the converted consensus scores. Specifically, as shown in FIG. 4, deciding whether the fault of the target power equipment results from the equipment quality may be implemented in the following way:

Step 401: respectively determining the consensus score of each consensus result;

Step 402: summing up the consensus scores of all the consensus results, to obtain a total consensus score;

Step 403: deciding whether the total consensus score is greater than a predetermined consensus score threshold; if Yes, Step 404 is executed, and if No, Step 405 is executed;

Step 404: deciding that the fault of the target power equipment results from the equipment quality, and ending the current process; and Step 405: deciding that the fault of the target power equipment does not result from the equipment quality.

Wherein, when the consensus score of a consensus result is determined in Step 401, the determined consensus score varies depending on the cause of the fault indicated by the consensus result and the role ranking of the consensus person giving the consensus result.

When a consensus result indicates that the fault of the target power equipment results from the equipment quality, it is decided that the consensus score corresponding to the consensus result is the consensus permission points of the consensus person giving the consensus result. Specifically, the consensus permission points of a consensus person correspond to the role ranking of the consensus person, consensus personnel with different role rankings having consensus permission points that are not completely the same, and consensus permission points that are greater than zero.

When a consensus result indicates that the fault of the target power equipment does not result from the equipment quality, it is decided that the consensus score corresponding to the consensus result is equal to zero.

Different consensus persons may have different role rankings, and appropriate consensus permission points are assigned to each of the consensus personnel based on the role rankings of the consensus personnel. When a consensus result given by a consensus person based on the fault data indicates that the fault of the target power equipment results from the equipment quality, the consensus permission points of the consensus person are taken as the consensus score corresponding to the consensus result; when a consensus result given by a consensus person based on the fault data indicates that the fault of the target power equipment does not result from the equipment quality, the consensus score corresponding to the consensus result is determined to be zero. In this way, more consensus personnel giving the first consensus result (indicating that the fault of the target power equipment results from the equipment quality) means that more consensus personnel decide that the fault of the target power equipment results from the equipment quality based on the fault data. When the total consensus score is greater than the predetermined consensus score threshold, it can be decided that the fault of the target power equipment results from the equipment quality.

Different consensus persons may have different role rankings, which can be determined based on the titles and position levels of the consensus personnel. Different role rankings reflect the knowledge level of the consensus personnel. A higher role ranking indicates a high knowledge level of the consensus person, and a consensus person having a higher role ranking has more consensus permission points.

After the consensus score of each of the consensus results is determined based on the fault cause indicated by the consensus results and the role rankings of the consensus personnel, all the consensus scores determined are summed up to obtain a total consensus score. When the total consensus score is greater than a predetermined consensus score threshold, it is decided that the fault of the target power equipment results from the equipment quality; when the total consensus score is smaller than or equal to the predetermined consensus score threshold, it is decided that the fault of the target power equipment does not result from the equipment quality. Since the total consensus score incorporates the decision of each of the consensus personnel on the cause of the fault, determining the cause of the fault of the target power equipment by comparing the total consensus score and the consensus score threshold ensures that the cause of the fault is more accurately determined.

Optionally, based upon the method for storing fault data provided by all the embodiments above, to obtain the fault data of the target power equipment in Step 101, the fault data may be obtained specifically from a portable data acquisition terminal. Specifically, the maintenance personnel may perform input operation on a portable data acquisition terminal on the site of the target power equipment, the portable data acquisition terminal may generate fault data based on the inputs by the maintenance personnel, and the fault data may comprise the appearance information and the root cause information of the fault of the target power equipment and image information and video information of the target power equipment. Appearance information is used to record the appearance of the target power equipment when or after a fault occurs, for example, whether it is burnt, deformed, discolored, etc.; root cause information is used to record the root cause of the fault of the target power equipment.

Specifically, the portable data acquisition terminal may provide multi-level options for appearance and root cause, and the maintenance personnel may select the proper items for appearance and root cause level by level based on the type of fault of the target power equipment. After the maintenance personnel select the items for appearance and root cause, the portable data acquisition terminal generates the corresponding fault data based on the items selected by the maintenance personnel. To generate the fault data, the maintenance personnel only need to select the items corresponding to the fault of the target power equipment from the options for appearance and root cause provided by the portable data acquisition terminal, but do not need to input descriptive texts, which not only ensures operation easiness for the maintenance personnel, but also ensures accuracy of the fault data generated.

Fault data may also comprise image information or video information of the target power equipment in addition to appearance information and root cause information. The maintenance personnel may collect images or video information of the target power equipment by the camera on the portable data acquisition terminal, and the portable data acquisition terminal will combine the collected image or video information with the appearance and root cause information input by the maintenance personnel and take the combined information as the fault data. Image or video information of the target power equipment is used as part of the fault data, so that the consensus personnel can more accurately decide the cause of the fault of the target power equipment based on the fault data comprising image or video information, i.e., the consensus personnel can give a more accurate consensus result, thereby ensuring accuracy of the final decision on the cause of the fault of the target power equipment.

Optionally, in the method for storing fault data provided by each of the embodiments above, after a consensus request targeting the fault data is sent to a consensus client, the consensus client can display the fault data to the corresponding consensus person, so that the consensus person can decide the cause of the fault of the target power equipment based on the fault data displayed. Further, a consensus client may display the fault data in the form of images or questionnaires to facilitate viewing by the consensus person.

Figure 5:
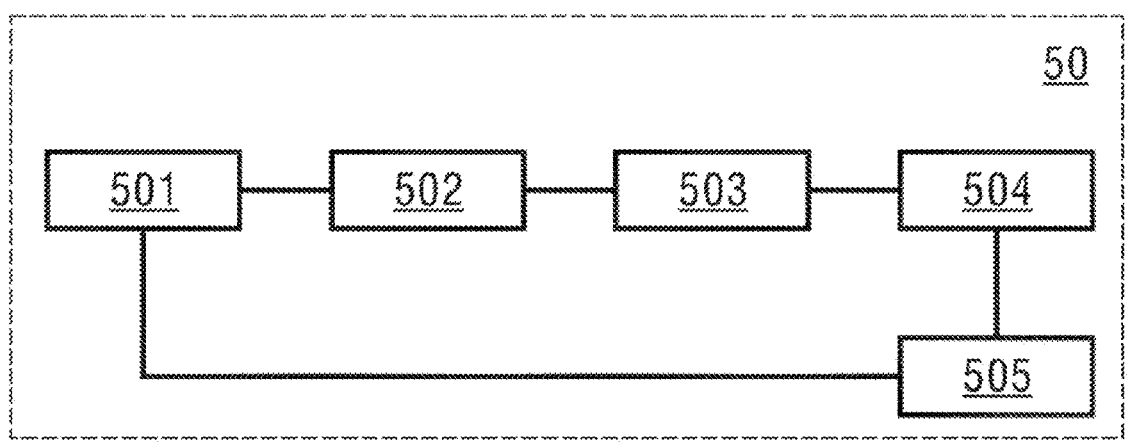
FIG. 5 is a schematic diagram of an apparatus for storing fault data provided by one embodiment of the present invention.

As shown in FIG. 5, one embodiment of the present invention provides an apparatus for storing fault data 50, which may comprise:

a data obtaining module 501, used to obtain fault data of target power equipment, wherein the target power equipment is faulty power equipment;

a request sending module 502, used to send a consensus request targeting the fault data obtained by the data obtaining module 501 to at least one consensus client 60, wherein the consensus request is used to request the consensus person using the consensus client 60 to give a consensus on the cause of the fault of the target power equipment;

a result receiving module 503, used to respectively receive a consensus result from each of the consensus clients 60, wherein the consensus result is formed by the consensus client 60 that receives the consensus request sent by the request sending module 502 based on triggering by the consensus person;

a consensus deciding module 504, used to decide whether the fault of the target power equipment results from the equipment quality based on each of the consensus results received by the result receiving module 503; and a first storage module 505, used to generate a first data block comprising the fault data obtained by the data obtaining module 501, and store the first data block in a blockchain, when the consensus deciding module 504 decides that the fault of the target power equipment results from the equipment quality.

In the embodiments of the present invention, the data obtaining module 501 can be used to execute Step 101 in the above method embodiments, the request sending module 502 can be used to execute Step 102 in the above method embodiments, the result receiving module 503 can be used to execute Step 103 in the above method embodiments, the consensus deciding module 504 can be used to execute Step 104 in the above method embodiments, and the first storage module 505 can be used to execute Step 105 in the above method embodiments.

Figure 6:
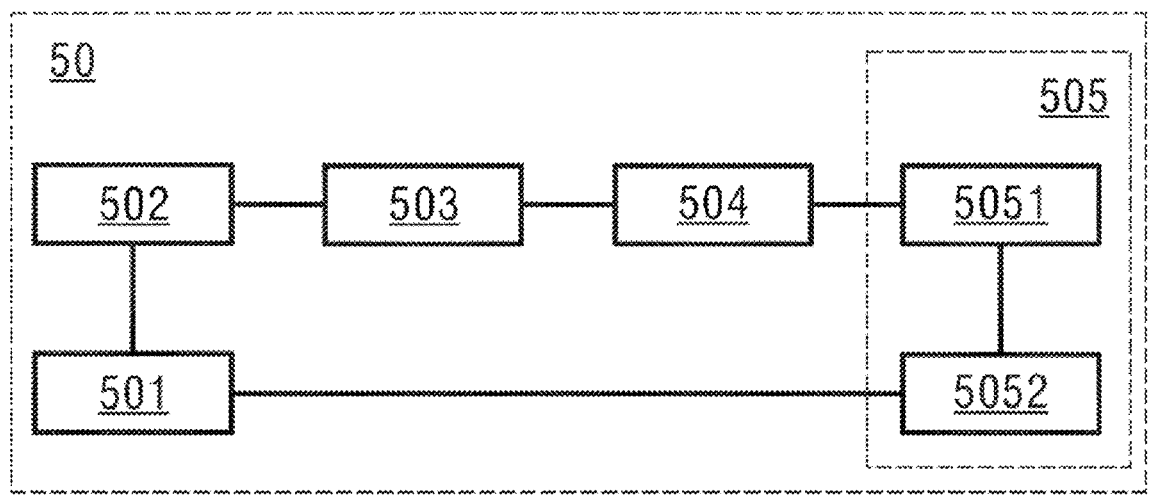
FIG. 6 is a schematic diagram of another apparatus for storing fault data provided by one embodiment of the present invention.

Optionally, based upon the apparatus for storing fault data 50 as shown in FIG. 5, as shown in FIG. 6, the first storage module 505 comprises:

a first information obtaining unit 5051, used to, for each of the consensus results received by the result receiving module, obtain the identity information of the consensus person who triggers the consensus client 60 to form the consensus result; and a first data block forming unit 5052, used to pack the fault data, each of the consensus results and the identity information obtained by the first information obtaining unit 5051, to obtain a first data block.

In the embodiments of the present invention, the first information obtaining unit 5051 can be used to execute Step 201 in the above method embodiments, and the first data block forming unit 5052 can be used to execute Step 202 in the above method embodiments.

Figure 7:
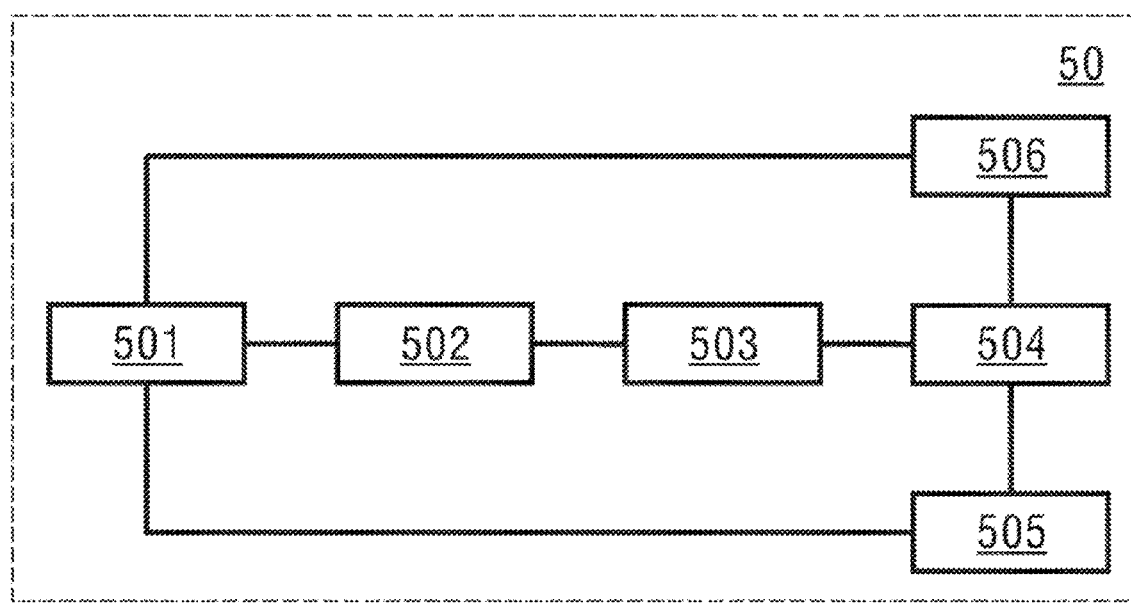
FIG. 7 is a schematic diagram of an apparatus for storing fault data comprising the second storage module provided by one embodiment of the present invention.

Optionally, based upon the apparatus for storing fault data 50 as shown in FIG. 5, as shown in FIG. 7, the apparatus for storing fault data 50 may further comprise:

a second storage module 506, used to generate a second data block comprising a data type identifier and the fault data obtained by the data obtaining module 501, and store the second data block in a blockchain, when the consensus deciding module 504 decides that the fault of the target power equipment does not result from the equipment quality, wherein the data type identifier is used to mark that the fault of the target power equipment does not result from the equipment quality.

Figure 8:
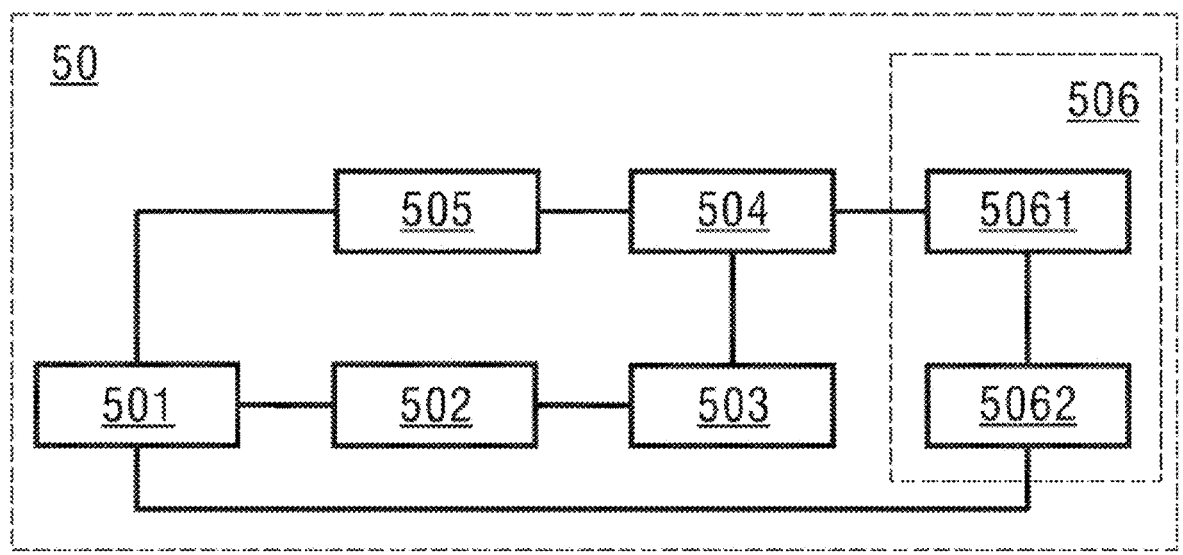
FIG. 8 is a schematic diagram of another apparatus for storing fault data comprising the second storage module provided by one embodiment of the present invention.

Optionally, based upon the apparatus for storing fault data 50 as shown in FIG. 7, as shown in FIG. 8, the second storage module 506 comprises:

a second information obtaining unit 5061, used to, for each of the consensus results received by the result receiving module, obtain the identity information of the consensus person who triggers the consensus client 60 to form the consensus result; and a second data block forming unit 5062, used to pack the fault data, the data type identifier, each of the consensus results and the identity information obtained by the second information obtaining unit 5061, to obtain a second data block.

In the embodiments of the present invention, the second information obtaining unit 5061 can be used to execute Step 301 in the above method embodiments, and the second data block forming unit 5062 can be used to execute Step 302 in the above method embodiments.

Figure 9:
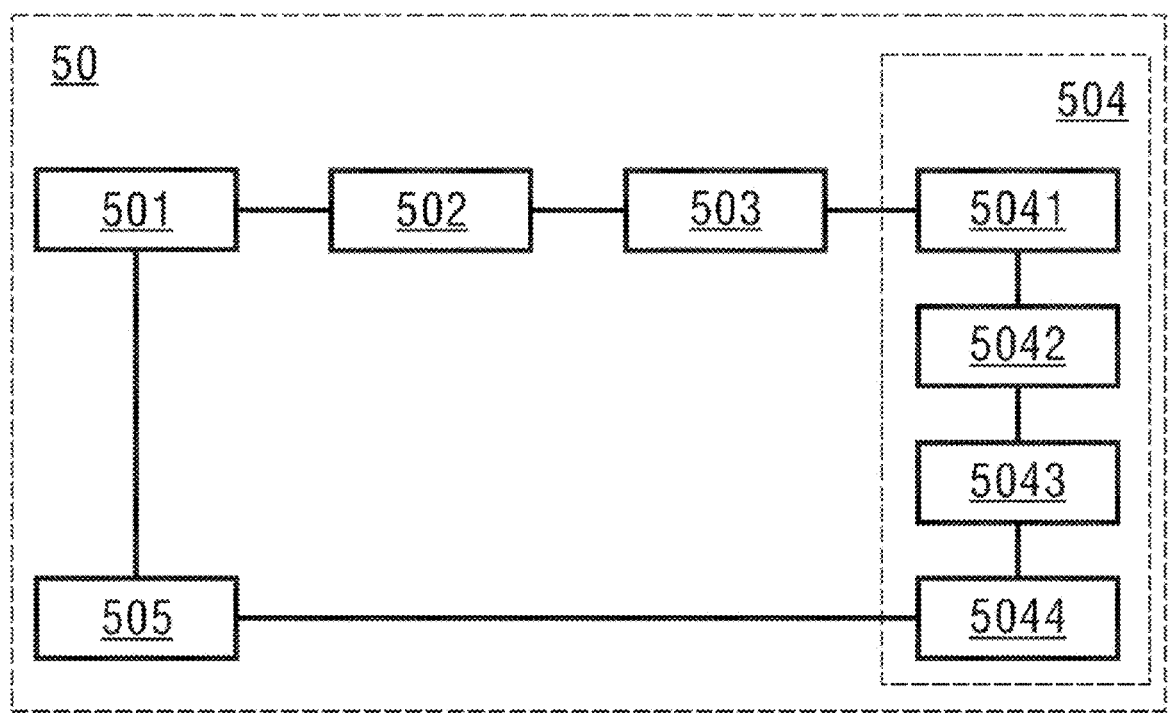
FIG. 9 is a schematic diagram of yet another apparatus for storing fault data provided by one embodiment of the present invention.

Optionally, based upon the apparatus for storing fault data 50 as shown in FIG. 5, as shown in FIG. 9, the consensus deciding module 504 comprises:

a score obtaining unit 5041, used to, for each of the consensus results, determine that the consensus score corresponding to the consensus result is consensus permission points when the consensus result indicates that the fault of the target power equipment results from the equipment quality, wherein the consensus permission points correspond to the role ranking of the consensus person who triggers the consensus client 60 to form the consensus result, different role rankings correspond to consensus permission points that are not completely the same, and the consensus permission points are greater than zero; and determine that the consensus score corresponding to the consensus result is equal to zero when the consensus result indicates that the fault of the target power equipment does not result from the equipment quality;

a score operation unit 5042, used to sum up all the consensus scores obtained by the score obtaining unit 5041, to obtain a total consensus score;

a score evaluation unit 5043, used to decide whether the total consensus score obtained by the score operation unit 5042 is greater than a predetermined consensus score threshold; and a result determining unit 5044, used to, based on the evaluation result of the score evaluation unit 5043, determine that the fault of the target power equipment results from the equipment quality when the total consensus score is greater than the consensus score threshold, and determine that the fault of the target power equipment does not result from the equipment quality when the total consensus score is smaller than or equal to the consensus score threshold.

In the embodiments of the present invention, the score obtaining unit 5041 can be used to execute Step 401 in the above method embodiments, the score operation unit 5042 can be used to execute Step 402 in the above method embodiments, the score evaluation unit 5043 can be used to execute Step 403 in the above method embodiments, and the result determining unit 5044 can be used to execute Step 404 and Step 405 in the above method embodiments.

Optionally, based upon the apparatus for storing fault data 50 as shown in any of FIGS. 7 to 9, the data obtaining module 501 is used to obtain the fault data from a portable terminal, wherein the fault data is generated by the portable terminal according to inputs by the maintenance personnel, and the fault data comprises part or all of the appearance information and the root cause information of the fault of the target power equipment and image information and video information of the target power equipment.

Figure 10:
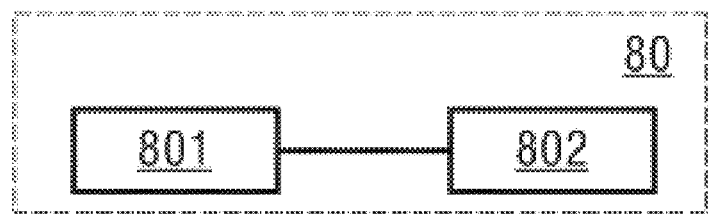
FIG. 10 is a schematic diagram of still another apparatus for storing fault data provided by one embodiment of the present invention.

As shown in FIG. 10, one embodiment of the present invention provides an apparatus for storing fault data 80, comprising: at least one memory 801 and at least one processor 802;

the at least one memory 801 is used to store a machine-readable program; and the at least one processor 802 is used to call the machine-readable program to execute the method for storing fault data provided by each of the above embodiments.

Figure 11:
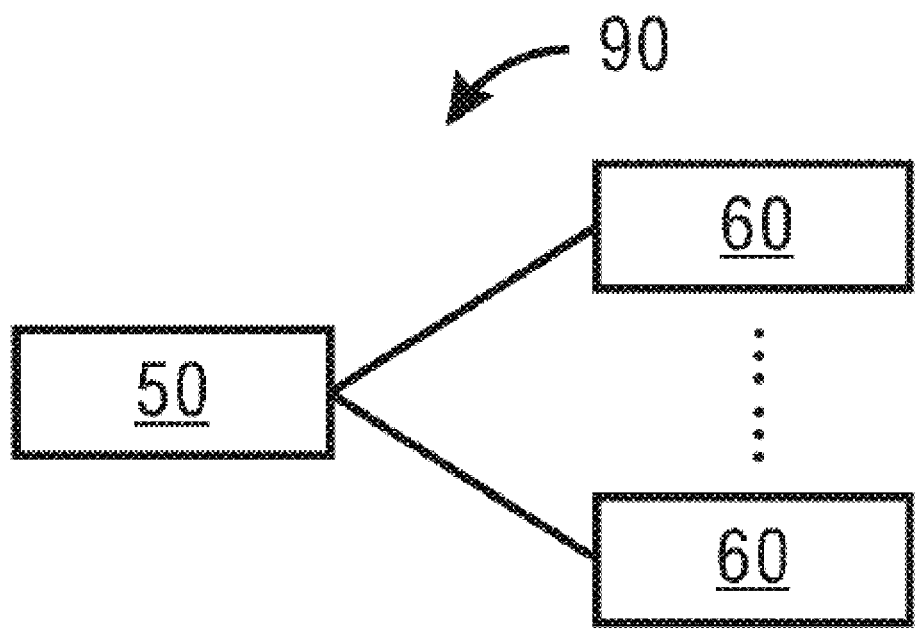
FIG. 11 is a schematic diagram of a system for storing fault data provided by one embodiment of the present invention.

As shown in FIG. 11, one embodiment of the present invention also provides a system for storing fault data 90, comprising: at least one consensus client 60 and an apparatus for storing fault data 50/80 provided by any of the above embodiments;

the consensus client 60 is used to receive the consensus request from the apparatus for storing fault data 50/80, display, based on the consensus request, the fault data targeted by the consensus request to a relevant consensus person, form a consensus result based on triggering by the consensus person, and send the consensus result to the apparatus for storing fault data 50/80.

After obtaining the fault data, the apparatus for storing fault data identifies at least one consensus person based on the target power equipment, and sends a consensus request targeting the fault data to the consensus clients used by each of the identified consensus personnel. After a consensus client receives a consensus request from the apparatus for storing fault data, the consensus client displays the fault data corresponding to the consensus request, and the consensus person decides the cause of the fault of the target power equipment based on the fault data displayed. The consensus client forms a consensus result corresponding to the decision result given by the consensus person, and sends the consensus result to the apparatus for storing fault data.

In the embodiments of the present invention, the consensus client may be a computer, smart phone, tablet PC or other devices used by the consensus personnel.

Figure 12:
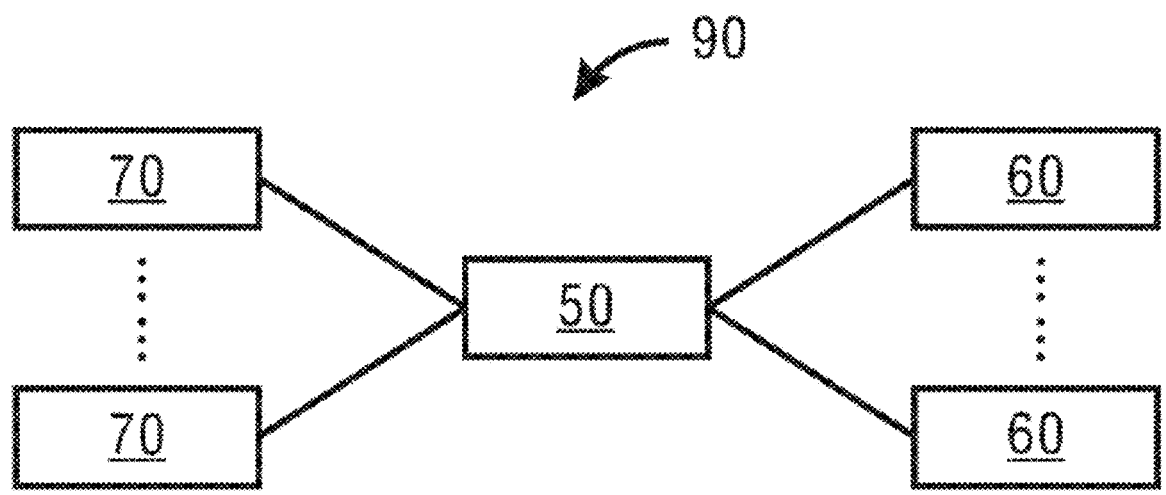
FIG. 12 is a schematic diagram of another system for storing fault data provided by one embodiment of the present invention.

Optionally, based upon the system for storing fault data 90 as shown in FIG. 11, as shown in FIG. 12, the system for storing fault data 90 may further comprise: at least one portable data acquisition terminal 70;

the portable data acquisition terminal 70 is used to generate the fault data according to inputs by the maintenance personnel, and send the fault data to the apparatus for storing fault data 50/80, wherein the fault data comprises part or all of the appearance information and the root cause information of the fault of the target power equipment and image information and video information of the target power equipment.

As power equipment is generally deployed outdoor or in plants and most power equipment is not equipped with the complete sensors, after arriving at the site of the faulty power equipment, the maintenance personnel may input fault information on the portable data acquisition terminal based on the specific conditions of the faulty power equipment, and then the portable data acquisition terminal can generate fault data based on the inputs by the maintenance personnel and send the generated fault data to the apparatus for storing fault data.

Specifically, the portable data acquisition terminal can provide some options in the form of a questionnaire, and the maintenance personnel select the proper items for appearance and root cause information from these options, so that the portable data acquisition terminal can generate the corresponding fault data. Wherein, appearance information is used to describe the appearance of power equipment when or after a fault occurs, and root cause information is used to describe the root cause of the fault of power equipment.

In addition, the maintenance personnel may also collect image and video information of the faulty power equipment by the portable data acquisition terminal, and thus the portable data acquisition terminal can send the inputs by the maintenance personnel and the collected image and video information as the fault data to the apparatus for storing fault data.

Figure 13:
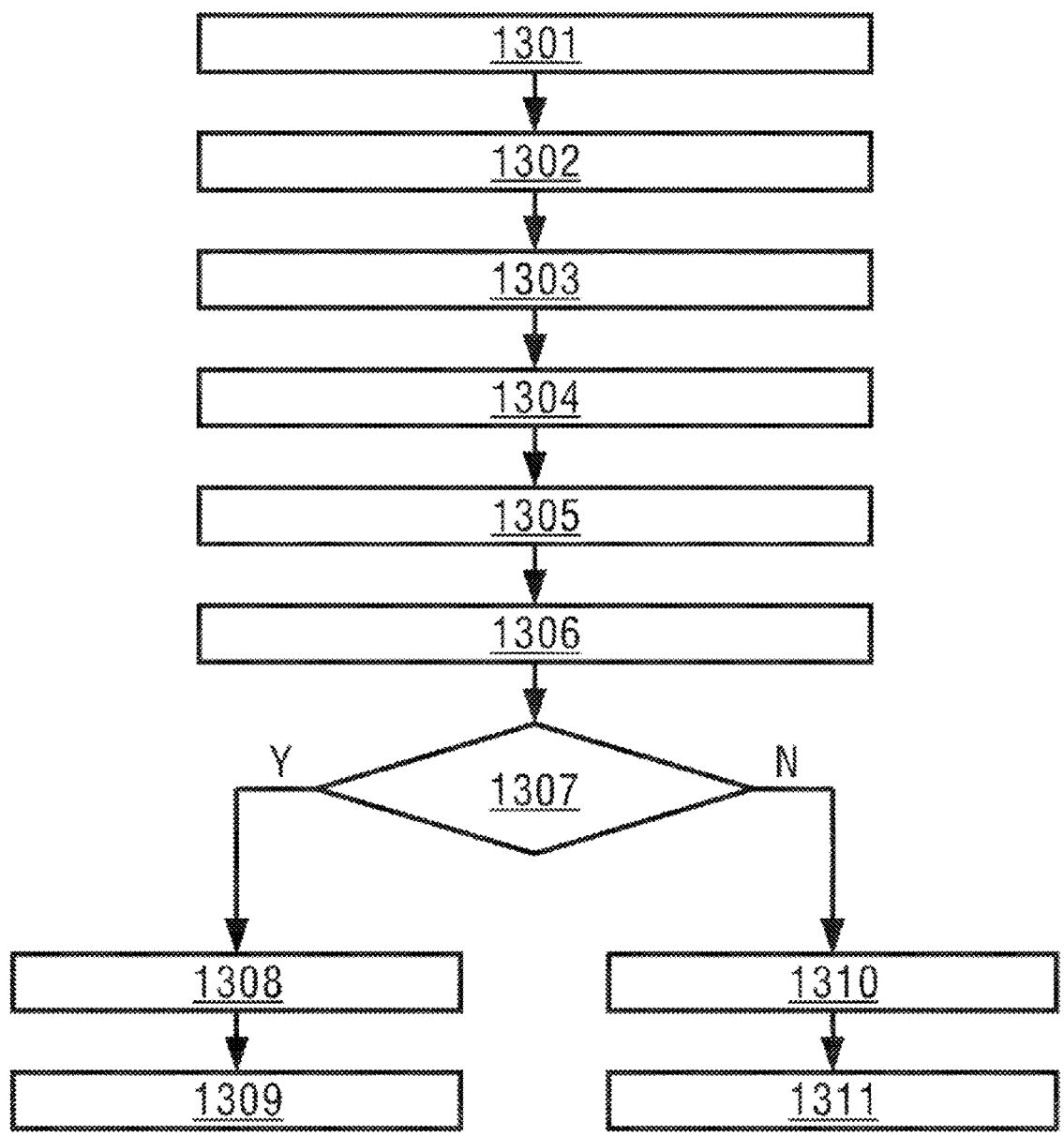
FIG. 13 is a flowchart of another method for storing fault data provided by one embodiment of the present invention.

The method for storing fault data provided by the embodiments of the present invention is described in more detail below with reference to the system for storing fault data 90 as shown in FIG. 11. As shown in FIG. 13, the method may comprise the following steps:

Step 1301: the apparatus for storing fault data obtains fault data of the target power equipment.

In the embodiments of the present invention, after the target power equipment has a fault, the maintenance personnel go to the site of the target power equipment, bringing a portable data acquisition terminal with them. Arriving at the site, the maintenance personnel select the items for appearance and root cause information on the portable data acquisition terminal based on the specific conditions of the target power equipment, and collect image or video information of the target power equipment by the portable data acquisition terminal. Then, the portable data acquisition terminal takes the appearance information and root cause information input by the maintenance personnel and the collected image information and video information as the fault data of the target power equipment, and sends the fault data to the apparatus for storing fault data.

Step 1302: the apparatus for storing fault data sends a consensus request to a consensus client.

In the embodiments of the present invention, after receiving the fault data, the apparatus for storing fault data generates a consensus request comprising the obtained fault data, and sends the consensus request to the consensus clients used by at least one consensus person in the field of the target power equipment.

For example, after obtaining the fault data, the apparatus for storing fault data sends a consensus request targeting the fault data to 6 consensus clients. Among them, the user of consensus client 1 is consensus person 1, who is the head of the maintenance team; the user of consensus client 2 is consensus person 2, who is the assistant head of the maintenance team; the user of consensus client 3 is consensus person 3, who is expert 1; the user of consensus client 4 is consensus person 4, who is expert 2; the user of consensus client 5 is consensus person 5, who is member 1 of the maintenance team; and the user of consensus client 6 is consensus person 6, who is member 2 of the maintenance team.

Step 1303: the consensus client obtains a consensus result given by a consensus person.

In the embodiments of the present invention, for each consensus client, after the consensus client receives a consensus request from the apparatus for storing fault data, the consensus client displays the fault data comprised in the consensus request in the form of images or questionnaires, and the consensus person selects a consensus result from two options provided by the consensus client based on the fault data displayed by the consensus client, wherein the first optional consensus result is that the fault of the target power equipment results from the equipment quality, while the second optional consensus result is that the fault of the target power equipment does not result from the equipment quality.

For example, consensus client 1 takes the first consensus result selected by consensus person 1 as consensus result 1, consensus client 2 takes the second consensus result selected by consensus person 2 as consensus result 2, consensus client 3 takes the first consensus result selected by consensus person 3 as consensus result 3, consensus client 4 takes the first consensus result selected by consensus person 4 as consensus result 4, consensus client 5 takes the first consensus result selected by consensus person 5 as consensus result 5, and consensus client 6 takes the second consensus result selected by consensus person 6 as consensus result 6.

Step 1304: the consensus client sends the obtained consensus result to the apparatus for storing fault data.

In the embodiments of the present invention, each consensus client separately sends the obtained consensus result to the apparatus for storing fault data.

Step 1305: the apparatus for storing fault data determines the consensus score of each consensus result.

In the embodiments of the present invention, for each consensus result obtained, if the consensus result is the first consensus result, i.e., a consensus result indicating that the fault of the target power equipment results from the equipment quality, the consensus permission points of the consensus person giving the consensus result will be taken as the consensus score of the consensus result; if the consensus result is the second consensus result, i.e., a consensus result indicating that the fault of the target power equipment does not result from the equipment quality, the consensus score of the consensus result will be determined as zero.

For example, the consensus permission points of consensus person 1 are 3, the consensus permission points of consensus person 2 are 2, the consensus permission points of both consensus person 3 and consensus person 4 are 4, and the consensus permission points of both consensus person 5 and consensus person 6 are 1. Since consensus result 1 and consensus results 3 to 5 are all the first consensus result while consensus result 2 and consensus result 6 are the second consensus result, it is determined that consensus result 1 has a consensus score of 3, consensus result 2 has a consensus score of 0, consensus result 3 has a consensus score of 4, consensus result 4 has a consensus score of 4, consensus result 5 has a consensus score of 1, and consensus result 6 has a consensus score of 0.

Step 1306: the apparatus for storing fault data sums up the consensus scores of all the consensus results, to obtain a total consensus score.

In the embodiments of the present invention, after determining the consensus score of each consensus result, the apparatus for storing fault data sums up all the consensus scores, to obtain a total consensus score.

For example, the apparatus for storing fault data sums up the 6 consensus scores of consensus results 1 to 6, with the sum being 12, and determines that the total consensus score is 12.

Step 1307: the apparatus for storing fault data decides whether the total consensus score is greater than a consensus score threshold, if Yes, Step 1308 is executed, and if No, Step 1310 is executed.

In the embodiments of the present invention, the apparatus for storing fault data compares the obtained total consensus score with a predetermined consensus score threshold, determines that the fault of the target power equipment results from the equipment quality and executes Step 1308 when the total consensus score is greater than the consensus score threshold, and determines that the fault of the target power equipment does not result from the equipment quality and execute Step 1310 when the total consensus score is smaller than or equal to the consensus score threshold.

For example, when the predetermined consensus score threshold is 10, it will be decided that the fault of the target power equipment results from the equipment quality if the total consensus score is greater than 10, and Step 1308 will be executed; and it will be decided that the fault of the target power equipment does not result from the equipment quality if the total consensus score is smaller than or equal to 10, and Step 1310 will be executed.

Step 1308: the apparatus for storing fault data generates a first data block.

In the embodiments of the present invention, after the apparatus for storing fault data determines that the fault of the target power equipment results from the equipment quality, the fault data, the consensus result sent by each consensus client and the identity information of the consensus personnel giving the consensus results are packed, to obtain a first data block.

Step 1309: the apparatus for storing fault data stores the first data block in a blockchain, and ends the current process.

In the embodiments of the present invention, after generating the first data block, the apparatus for storing fault data stores the first data block in a blockchain.

Step 1310: the apparatus for storing fault data generates a second data block.

In the embodiments of the present invention, after the apparatus for storing fault data determines that the fault of the target power equipment does not result from the equipment quality, the fault data, a data type identifier, the consensus result sent by each consensus client and the identity information of the consensus personnel giving the consensus results are packed, to obtain a second data block. Wherein, the data type identifier is used to mark that the fault of the target power equipment does not result from the equipment quality.

Step 1311: the apparatus for storing fault data stores the second data block in a blockchain.

In the embodiments of the present invention, after generating the second data block, the apparatus for storing fault data stores the second data block in a blockchain.

An embodiment of the present invention also provides a computer-readable medium, which stores an instruction used to cause a computer to execute the method for storing fault data of an embodiment, described herein. Specifically, a system or device equipped with a storage medium may be provided, the software program code for implementing the functions of any of the above embodiments is stored on the storage medium, so that a computer (or CPU or MPU) of the system or device reads and executes the program code stored in the storage medium.

In this case, the program code itself read from the storage medium can implement the functions of any of the above embodiments, and so the program code and the storage medium storing the program code constitute part of the present invention.

Implementations of the storage media used to provide the program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROMs. Optionally, the program code may be downloaded from a server computer via a communication network.

In addition, it should be clear that, the operating system operating on a computer may be used to perform part or all of the actual operations and thus implement the functions of any of the above embodiments not only through executing a program code read by the computer but also through an instruction based on the program code.

It can be understood that it is possible to write the program code read from the storage medium to the memory provided in an expansion board inserted into the computer or to the memory provided in an expansion unit connected to the computer, and then the program code-based instructions cause the CPU, etc. mounted on the expansion board or the expansion unit to perform part and all of the actual operations, so as to implement the functions of any of the above embodiments.

It should be noted that not all steps and modules in the above processes and system structural diagrams are necessary, and some steps or modules may be ignored based on actual needs. The sequence of execution of the steps is not fixed, and can be adjusted as needed. The system structure described in the above embodiments may be a physical structure or a logical structure, i.e., some modules may be implemented by the same physical entity, or some modules may be implemented by multiple physical entities, or may be implemented by certain components in several independent devices working together.

In the above embodiments, the hardware units may be implemented mechanically or electrically. For example, a hardware unit may comprise a permanent dedicated circuit or logic (such as a dedicated processor, FPGA or ASIC) to complete the corresponding operation. The hardware unit may also comprise a programmable logic or circuit (such as a general-purpose processor or other programmable processors), which may be temporarily set by software to complete the corresponding operation. The specific implementation method (mechanical, or by a dedicated permanent circuit, or a temporarily set circuit) may be determined based on the cost and time considerations.

The present invention has been demonstrated and described in detail through the drawings and preferred embodiments above. However, the present invention is not limited to these disclosed embodiments. Based on the above embodiments, those skilled in the art can know that the code review methods in the different embodiments above may be combined to obtain more embodiments of the present invention, and these embodiments also fall within the scope of the present invention.

What is claimed is:

1. A method for storing fault data, the method comprising:
obtaining fault data of target power equipment, the target power equipment including faulty power equipment;
sending a consensus request targeting the fault data to at least one consensus client, the consensus request being usable to request a person using the at least one consensus client to provide a consensus on a cause of the fault of the target power equipment;
receiving a respective consensus result from each respective consensus client of the at least one consensus client, the respective consensus result being formed by the respective consensus client based on triggering by a consensus person;
determining whether the fault of the target power equipment results from equipment quality based on received consensus results;
generating a first data block including the fault data and storing the first data block in a blockchain in response to determining that the fault of the target power equipment results from the equipment quality;
generating a second data block including the fault data and a data type identifier, the data type identifier that the fault of the target power equipment does not result from the equipment quality; and storing the second data block in a blockchain in response to determining that the fault of the target power equipment does not result from the equipment quality.

2. The method of claim 1, wherein the generating the first data block includes:

obtaining, for each respective consensus result, identity information of the consensus person who triggers the consensus client to form the respective consensus result; and wherein the generating the first data block includes generating the first data block by packing the fault data of each respective consensus result and the identity information corresponding to each respective consensus result.

3. The method of claim 2, wherein the generating the second data block includes:

obtaining, for each respective consensus result, respective identity information of the consensus person who triggers the consensus client to form the consensus result; and generating the second data block by packing the fault data, the data type identifier, each respective consensus result of the consensus results, and the respective identity information corresponding to each respective consensus result.

4. The method of claim 2, wherein the determining whether the fault of the target power equipment results from the equipment quality based on the received consensus results includes:

determining, for each respective consensus result that the consensus score corresponding to the respective consensus result is consensus permission points in response to the respective consensus result indicating that the fault of the target power equipment results from the equipment quality, the consensus permission points corresponding to a role ranking of the consensus person who triggers the consensus client to form the respective consensus result, different role rankings corresponding to consensus permission points that are not completely alike, and the consensus permission points being greater than zero;

determining that the respective consensus score corresponding to the respective consensus result is equal to zero in response to the respective consensus result indicating that the fault of the target power equipment does not result from the equipment quality;

obtaining a total consensus score by summing the respective consensus scores of all the respective consensus results;

determining whether the total consensus score is greater than a consensus score threshold;

determining that the fault of the target power equipment results from the equipment quality in response to the total consensus score being greater than the consensus score threshold; and determining that the fault of the target power equipment does not result from the equipment quality in response to the total consensus score being less than or equal to the consensus score threshold.

5. The method of claim 2, wherein the obtaining the fault data includes:

obtaining the fault data from a portable data acquisition terminal, the fault data being generated by the portable data acquisition terminal according to inputs by maintenance personnel, and the fault data including part or all of appearance information and root cause information of the fault of the target power equipment, and image information and video information of the target power equipment.

6. The method of claim 1, wherein the generating the second data block includes:

obtaining, for each respective consensus result, respective identity information of the consensus person who triggers the consensus client to form the consensus result; and generating the second data block by packing the fault data, the data type identifier, each respective consensus result of the consensus results, and the respective identity information corresponding to each respective consensus result.

7. The method of claim 1, wherein the determining whether the fault of the target power equipment results from the equipment quality based on the received consensus results includes:

determining, for each respective consensus result, that the consensus score corresponding to the respective consensus result is consensus permission points in response to the respective consensus result indicating that the fault of the target power equipment results from the equipment quality, the consensus permission points corresponding to a role ranking of the consensus person who triggers the consensus client to form the respective consensus result, different role rankings corresponding to consensus permission points that are not completely alike, and the consensus permission points being greater than zero;

determining that the respective consensus score corresponding to the respective consensus result is equal to zero in response to the respective consensus result indicating that the fault of the target power equipment does not result from the equipment quality;

obtaining a total consensus score by summing the respective consensus scores of all the respective consensus results;

determining whether the total consensus score is greater than a consensus score threshold;

determining that the fault of the target power equipment results from the equipment quality in response to the total consensus score being greater than the consensus score threshold; and determining that the fault of the target power equipment does not result from the equipment quality in response to the total consensus score being less than or equal to the consensus score threshold.

8. The method of claim 1, wherein the obtaining the fault data includes:

obtaining the fault data from a portable data acquisition terminal, the fault data being generated by the portable data acquisition terminal according to inputs by maintenance personnel, and the fault data including part or all of appearance information and root cause information of the fault of the target power equipment, and image information and video information of the target power equipment.

9. An apparatus for storing fault data, the apparatus comprising:

a data obtaining module configured to obtain fault data of target power equipment, the target power equipment including faulty power equipment;

a request sending module configured to send a consensus request targeting the fault data obtained by the data obtaining module, to at least one consensus client, the consensus request being used to request a consensus person using the at least one consensus client to give a consensus on a cause of the fault of the target power equipment;

a result receiving module configured to receive a respective consensus result from each respective consensus client of the at least one consensus client, the respective consensus result being formed by the respective consensus client receiving the respective consensus request sent by the request sending module based on triggering by the consensus person;

a consensus deciding module configured to determine whether a fault of the target power equipment results from equipment quality based on each of the respective consensus results;

a first storage module configured to generate a first data block including the fault data and store the first data block in a blockchain in response to the consensus deciding module determining that the fault of the target power equipment results from the equipment quality; and a second storage module configured to
 generate a second data block including the fault data and a data type identifier, the data type identifier indicating that the fault to the target power equipment does not result from the equipment quality, and
 store the second data block in a blockchain in response to the consensus deciding module determining that the fault of the target power equipment does not result from the equipment quality.

10. The apparatus of claim 9, wherein the first storage module comprises:
 a first information obtaining unit configured to obtain, for each respective consensus result, respective-identity information of the consensus person who triggers the respective consensus client to form the respective consensus result; and
 a first data block forming configured to generate the first data block by packing the fault data of each respective consensus result and the respective identity information.

11. The apparatus of 7, wherein the second storage module comprises:
 a second information obtaining configured to obtain, for each respective consensus result, identity information of the consensus person who triggers the consensus client to form the consensus result; and
 a second data block forming unit configured to obtain a second data block by packing the fault data, the data type identifier, each respective consensus result of the consensus results, and the identity information.

12. The apparatus of claim 9, wherein the consensus deciding module comprises:
 a score obtaining, unit configured to determine, for each respective consensus result of the consensus results, that a respective consensus score corresponding to the respective consensus result is consensus permission points in response to the respective consensus result indicating that the fault of the target power equipment results from the equipment quality,
 wherein the consensus permission points correspond to a role ranking of the consensus person who triggers the respective consensus client to form the respective consensus result, different role rankings corresponding to consensus permission points that are not completely alike, and the consensus permission points being greater than zero; and determine that the consensus score corresponding to the consensus result is equal to zero when the respective consensus result indicates that the fault of the target power equipment does not result from the equipment quality;

a score operation unit configured obtain a total consensus score by summing all the consensus scores obtained by the score obtaining unit;

a score evaluation, unit configured to determine whether the total consensus score is greater than a consensus score threshold; and a result determining, unit configured to
 determine that the fault of the target power equipment results from the equipment quality in response to the total consensus score being greater than the consensus score threshold, and
 determine that the fault of the target power equipment does not result from the equipment quality in response to the total consensus score being less than or equal to the consensus score threshold.

13. The apparatus of claim 9, wherein
the data obtaining module is further configured to obtain the fault data from a portable terminal, the fault data being generated by the portable terminal according to inputs by maintenance personnel, and the fault data including
 part or all of appearance information and root cause information of the fault of the target power equipment, and
image information and video information of the target power equipment.

14. An apparatus for storing fault data, the apparatus comprising:
 at least one memory configured to store a machine-readable program; and
 at least one processor configured, with the at least one memory, cause the apparatus at least to;
  obtain fault data of target power equipment, the target power equipment including faulty power equipment
  send a consensus request targeting the fault data to at least one consensus client, the consensus request being usable to request a person using the at least one consensus client to provide a consensus on a cause of the fault of the target power equipment
  receive a respective consensus result from each respective consensus client of the at least one consensus client, the respective consensus result being formed by the respective consensus client based on triggering by a consensus person,
  determine whether the fault of the target power equipment results from equipment quality based on received consensus results,
  generate a first data block including the fault data and storing the first data block in a blockchain in response to determining that the fault of the target power equipment results from the equipment quality,
  generate a second data block including the fault data and a data type identifier, the data type identifier indicating that the fault of the target power equipment does not result from the equipment quality, and
  store the second data block in a blockchain in response to determining that the fault of the target power equipment does not result from the equipment quality.

15. A system for storing fault data, comprising:
at least one consensus client; and
the apparatus for storing fault data of claim 7;
wherein the at least one consensus client is configured to
- receive the consensus request from the apparatus for storing fault data,
- display, based on the consensus request, the fault data targeted by the consensus request to a relevant consensus person,
- form a consensus result based on triggering by the consensus person, and
- send the consensus result to the apparatus for storing fault data.

16. The system of claim 15, further comprising:
at least one portable data acquisition terminal configured to
- generate the fault data according to inputs by maintenance personnel, and
- send the fault data to the apparatus for storing fault data, wherein the fault data includes
- part or all of appearance information and root cause information of the fault of the target power equipment and image information, and
- video information of the target power equipment.

\* \* \* \* \*